US012341604B2

(12) United States Patent
Tawn

(10) Patent No.: US 12,341,604 B2
(45) Date of Patent: Jun. 24, 2025

(54) COUNTER MEASURE EFFECTOR WITH SMART SIGHT

(71) Applicant: SteelRock Technologies Limited, London (GB)

(72) Inventor: Richard Tawn, Wales (GB)

(73) Assignee: STEELROCK TECHNOLOGIES LIMITED, London (GB)

( * ) Notice: Subject to any disclaimer, the term of this patent is extended or adjusted under 35 U.S.C. 154(b) by 342 days.

(21) Appl. No.: 17/863,259

(22) Filed: Jul. 12, 2022

(65) Prior Publication Data

US 2023/0016524 A1 Jan. 19, 2023

(30) Foreign Application Priority Data

Jul. 13, 2021 (GB) ..................................... 2110077

(51) Int. Cl.
*H04K 3/00* (2006.01)
*F41H 11/02* (2006.01)
*F41H 13/00* (2006.01)

(52) U.S. Cl.
CPC ............... *H04K 3/42* (2013.01); *F41H 11/02* (2013.01); *F41H 13/0093* (2013.01); *H04K 3/62* (2013.01); *H04K 3/90* (2013.01); *H04K 3/92* (2013.01); *H04K 2203/22* (2013.01); *H04K 2203/24* (2013.01)

(58) Field of Classification Search
CPC ............. H04K 3/00; H04K 3/65; G06V 10/25
See application file for complete search history.

(56) References Cited

U.S. PATENT DOCUMENTS 9,689,976 B2 * 6/2017 Parker ...................... H04K 3/45
9,715,009 B1 * 7/2017 Parker ...................... H04K 3/45
10,020,909 B2 * 7/2018 Stamm ..................... H04K 3/90
10,103,835 B2 * 10/2018 Morrow ................... H04K 3/65
10,574,384 B2 * 2/2020 Morrow ................... H04K 3/65
11,233,978 B1 * 1/2022 Morrow ................... H04K 3/65
(Continued)

FOREIGN PATENT DOCUMENTS

GB 2580444 A 7/2020
WO 2018217495 A1 11/2018

OTHER PUBLICATIONS

UK Search Report for Corresponding Application Serial No. GB2110077.1, Dated Dec. 14, 2021, p. 1.
(Continued)

*Primary Examiner* — Bernarr E Gregory
(74) *Attorney, Agent, or Firm* — Tarolli, Sundheim, Covell & Tummino LLP

(57) ABSTRACT

The present disclosure relates to a counter measure effector (100) for targeting unmanned aerial vehicles (UAVs), said counter measure effector comprising: at least one antenna (108, 109) for selectively emitting electromagnetic radiation; a telescopic sight (126) comprising an optical system that is transferrable between a first state, in which the optical system has a first appearance, and a second state, in which the optical system has a second appearance that is different from the first appearance, wherein the counter measure effector (100) is configured to set the optical system in its first state, when the at least one antenna is activated, and in its second state, when the at least one antenna is de-activated.

20 Claims, 4 Drawing Sheets

(56) References Cited

U.S. PATENT DOCUMENTS

| | | | | |
|---|---|---|---|---|
| 11,488,385 | B2 * | 11/2022 | Morrow | H04K 3/45 |
| 2018/0234203 | A1 * | 8/2018 | Hsiao | H04K 3/90 |
| 2020/0272827 | A1 | 8/2020 | Morrow et al. | |
| 2022/0406067 | A1 * | 12/2022 | Seeber | G06V 10/25 |

OTHER PUBLICATIONS

International Search Report for Corresponding Application Serial No. PCT/GB2022/051594, Dated Sep. 29, 2022, pp. 1-10.

* cited by examiner

COUNTER MEASURE EFFECTOR WITH SMART SIGHT

BACKGROUND OF THE INVENTION

The present disclosure relates to a counter measure effector, particularly but not exclusively, to a counter measure effector against unmanned aerial vehicles. Other aspects of the present disclosure relate to a method of controlling a counter measure effector.

Unmanned vehicles, particularly unmanned aerial vehicles (UAV), are an increasingly common sight. Mostly civil in nature, these UAVs are typically harmless to the public. Examples include drones for aerial building observation or even delivery drones that have recently been tested by shipping companies. However, occasionally even such commercial, "off the shelf" drones are used by individuals or companies for industrial espionage to obtain confidential information from their competitors, as well as for other nefarious purposes. Other types of UAVs are used for military purposes, such as spying missions or even performing physical attacks on foreign territory. Military grade UAVs can be dangerous not only for military personnel but also for civilian life.

In view of the above, counter measure systems are known that may be used to neutralise threats caused by UAVs. Such counter measure systems typically include one or more electronic counter measure effectors ("ECM", also known as jammers) configured to emit electromagnetic radiation towards UAVs to take over control and/or disable unauthorised UAVs.

Most ECMs use radio frequency ("RF") signals to generate a neutralising effect on target UAV's and other autonomous threats. By its nature, emitted RF is incapable of being sensed by humans, in marked contrast to kinetic weapon systems, where human senses as to system operation include audio, visual, sensory and olfactory triggers.

The difficulty associated with the human inability to detect RF emitted from ECM raises safety concerns for operators of such equipment, as it is practically impossible for the operator to know when the system is in use. For example, RF emitted by ECM must not be directed at the wrong type of UAV or at the wrong time. In one scenario, a military grade UAV may carry a payload and thus should never be deactivated via RF emitted by the ECM when the UAV is located above inhabited areas.

It is an aim of the present disclosure to solve or at least ameliorate one or more problems of the prior art.

SUMMARY OF THE INVENTION

Aspects and embodiments of the disclosure a counter measure effector and a method of controlling a counter measure effector as claimed in the appended claims.

According to a first aspect of the present disclosure, there is provided a counter measure effector for targeting unmanned aerial vehicles (UAVs), said counter measure effector comprising:

at least one antenna for selectively emitting electromagnetic radiation;

a telescopic sight comprising an optical system that is transferrable between a first state, in which the optical system has a first appearance, and a second state, in which the optical system has a second appearance that is different from the first appearance, wherein the counter measure effector is configured to set the optical system in its first state, when the at least one antenna is activated, and in its second state, when the at least one antenna is de-activated.

In one embodiment, in the first state, at least parts of the optical system of the telescopic sight have a first colour, and, in the second state, at least parts of the optical system have a second colour.

In another embodiment, the optical system comprises a reticule configured to be illuminated in a first colour, when the optical system is set to its first state, and illuminated in a second colour, when the optical system is in its second state.

In another embodiment, the telescopic sight comprises a reticule and is configured to project operating parameters of the counter measure effector onto the reticule.

In another embodiment, the operating parameters comprises one or more of:

a frequency band selected for emission of electromagnetic radiation;

an orientation of the counter measure effector;

a battery status of the counter measure effector.

In another embodiment, the telescopic sight comprises a reticule and is configured to project target-data representative of a target UAV onto the reticule.

In another embodiment, the target-data comprises one or more of:

a distance of the target UAV from the counter measure effector;

an altitude at which the target UAV is located;

a travel speed of the target UAV;

a communication bandwidth used by the target UAV.

In another embodiment, the telescopic sight is a holographic sight.

In another embodiment, the counter measure effector comprises a power supply for generating electromagnetic radiation, wherein the telescopic sight is connected to said power supply.

In another embodiment, the telescopic sight comprises a first light source and a second light source, and wherein, in the first state of the optical system, the power supply is connected to the first light source, and, in the second state of the optical system, the power supply is connected to the second light source.

In another embodiment, the telescopic sight comprises a sight mount for removable, mechanical connection to a mounting rail of the body.

In another embodiment, the mounting rail and the sight mount comprise corresponding electrical contacts arranged such the electrical contacts engage, when the sight mount is mechanically connected to the mounting rail.

In another embodiment, the electrical contacts of the sight mount comprise spring pins configured to be depressed against the electrical contacts of the mounting rail, when the sight mount is mechanically connected to the mounting rail.

According to another aspect of the present disclosure, there is provided a method of controlling a counter measure effector, the counter measure effector comprising:

at least one antenna for selectively emitting electromagnetic radiation;

a telescopic sight comprising an optical system that is transferrable between a first state, in which the optical system has a first appearance, and a second state, in which the optical system has a second appearance that is different from the first appearance;

wherein the method comprises:

receiving activation-data indicative of an activation status of the counter measure effector;

transferring the optical system into its second state when the activation-data is indicative of the counter measure effector being active.

In another embodiment, the method comprises:

receiving command-data indicative of a permission to activate the counter measure effector;

transferring the optical system into its second state when the command-data is indicative of a prohibition of activating the counter measure effector.

In another embodiment, the method comprises transferring the optical system into its first state if the command-data is indicative of a permission to activate the counter measure effector and the activation-data is indicative of the counter measure being inactive.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which.

DETAILED DESCRIPTION OF THE DRAWINGS

Figure 1:
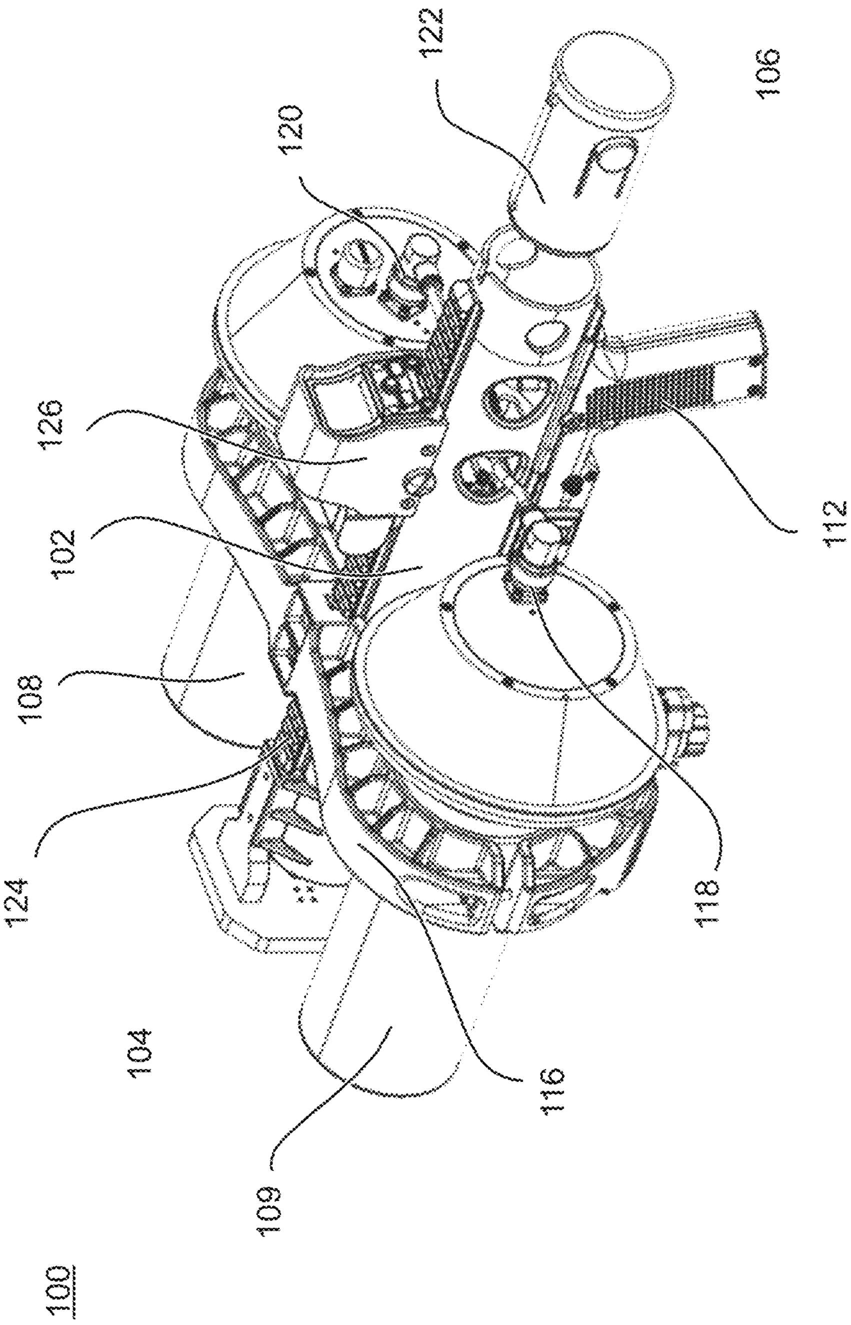
FIG. 1 shows a perspective view of an exemplary electronic counter measure effector (ECM)

In the following description and accompanying drawings, corresponding features of different embodiments are, preferably, identified using corresponding reference numerals.

FIG. 1 shows a perspective view of an exemplary electronic counter measure effector (ECM) 100. The ECM 100 comprises a body 102. The body 102 is elongate with a first (or "rear") end 106 and a second (or "front") end 104.

The body 102 is ideally formed from a material configured to inhibit conduction of radio frequency (RF) signals. For example, the body 102 may comprise the polymer NylonX™. Additionally, or alternatively, the body 102 may comprise Kevlar™.

RF antennas 108, 109 are provided adjacent to the body 102 such that, in use, the RF antennas 108, 109 are forward-facing. The RF antennas 108, 109 are configured both to transmit and receive RF signals. The RF antennas 108, 109 of this embodiment are cylindrical antennas.

The RF antennas 108, 109 may be detachably mountable on either side of the body 102. FIG. 1 shows detachable RF antennas 108, 109 mounted to the body 102 of the ECM 100 via an antenna mount 116. The detachable RF antennas 108, 109 are preferably helical RF antenna, having a cylindrical shape. The detachable RF antennas 108, 109 may be configured to transmit RF signals in an "effector" frequency band. The detachable RF antennas 108, 109 each have external RF connectors 118, 120 for coupling the detachable RF antennas 108, 109 to a control unit described below. The external RF connectors 118, 120 are, preferably, SubMiniature version A (SMA) connectors, though other types of RF connector may be used.

Between the rear end 106 and the front end 104 of the ECM 100, there is provided a data interface for connecting the ECM 100 to a separate control unit (not shown). The data interface is in data communication with the RF antennas 108, 109. The body 102 is at least partially hollow. An internal conduit is thereby provided through the body 102 for communication of RF data between the RF antennas 108, 109 and the data interface. The communication of RF data is via cabling (not shown) disposed within the internal conduit of the body 102. The cabling is, preferably, electromagnetically (EMC) shielded.

The body 102 of the ECM 100 comprises a removable battery pack 122 and one or more hand-grips, such as a pistol-type 112 grip and a fore-grip (not shown) removably mounted to the body 102 of the ECM 100. Of course, depending on the design of the ECM 100, only a single grip component, in the form of a pistol-type hand-grip, for example, may be mounted to the ECM 100. By providing for two hand-grips to be mounted as stabilising components, however, the ECM 100 can be better stabilised by an operator, in use.

The ECM 100 of FIG. 1 also comprises an accessory (or sensor) mounting rail 124. In the embodiment shown, a telescopic sight 126 is removably attached to the mounting rail and thus to the body 102. The connection between the telescopic sight 126 and the mounting rail 124 will be described in more detail below. Of course, many other suitable accessories or sensors may also be attached to the mounting rail 124.

The mounting rail 124 is arranged on an upper side of the body 102, particularly along a longitudinal direction of the body 102. The mounting rail 124 may be detached from the body 102 if required, by removal of securing screws (not shown). The attachment rail 124 may be a Picatinny rail or a Weaver rail, for example.

The telescopic sight 126 (also known as a scope) is an optical sighting device that comprises an optical system, such as a refracting telescope to allow the user to identify and aim at targets in the distance. The telescopic sight is equipped with a reticule (202, FIG. 2A) mounted in a focally point of the optical system to provide an accurate point of aim.

Figure 2B:
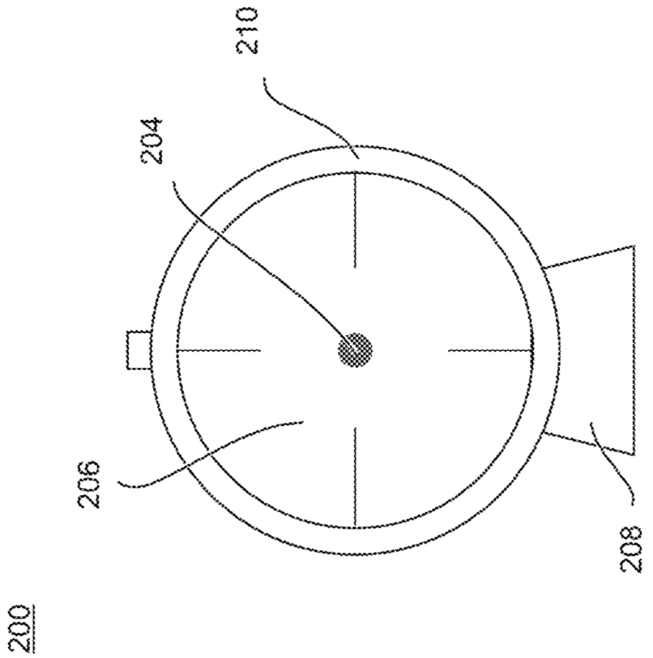
FIGS. 2A and 2B show schematic front views of a telescopic sight according to an embodiment of the present disclosure.
Figure 2A:
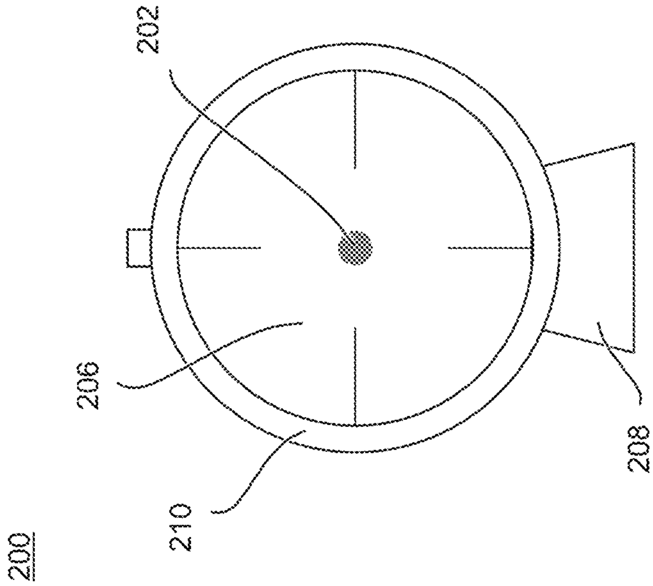

A front view of an exemplary, simplified telescopic sight 200 is shown in FIGS. 2A and 2B. The telescopic sight 200 comprises an optical system arranged within a housing 210. The housing 210 is connected to a sight mount 208 for removably attaching the telescopic sight to a corresponding mounting rail (see 124, FIG. 1) of the ECM.

The telescopic sight 200 has a first state, in which the optical system has a first appearance (e.g. FIG. 2A). The optical system of the telescopic sight 200 also has a second state, in which the optical system has a second appearance (e.g. FIG. 2B) that is different from the first appearance. In the example of FIGS. 2A and 2B, the first appearance is defined by a green pointer 202, whereas the second appearance is defined by a red pointer 204, visible within the optical system.

In FIGS. 2A and 2B the telescopic sight 200 shown is a holographic sight. The optical system comprises a reticule 206 configured to be illuminated in a first colour 202 (e.g. green) by a first light source, when the optical system is set to its first state, and illuminated in a second colour 204 (e.g. red) by a second light source, when the optical system is in its second state. In particular, the telescopic sight 200 may include a first LED pointer (not shown) illuminating the centre of the reticule 206 in a first colour 202 when the optical system is set to its first state, and a second LED pointer (not shown) illuminating the centre of the reticule 206 in a second colour 204 when the optical system is set to its second state. In alternative examples, there may be provided a single LED pointer configured to illuminate the reticule in two different colours.

It will be understood that illuminating the reticule with dots of various colours is only one way of changing the appearance of the optical system of the telescopic sight 200 between its first and second states. In other examples, the entire reticule may be illuminated in various colours. In yet other examples, the colour may not change but the reticule 206 may be illuminated with differently shaped light projections, such as dots, circles, squares, triangles, crosses etc, as long as the appearance in the first state of the optical system differs from the appearance of the second state.

Figure 3:
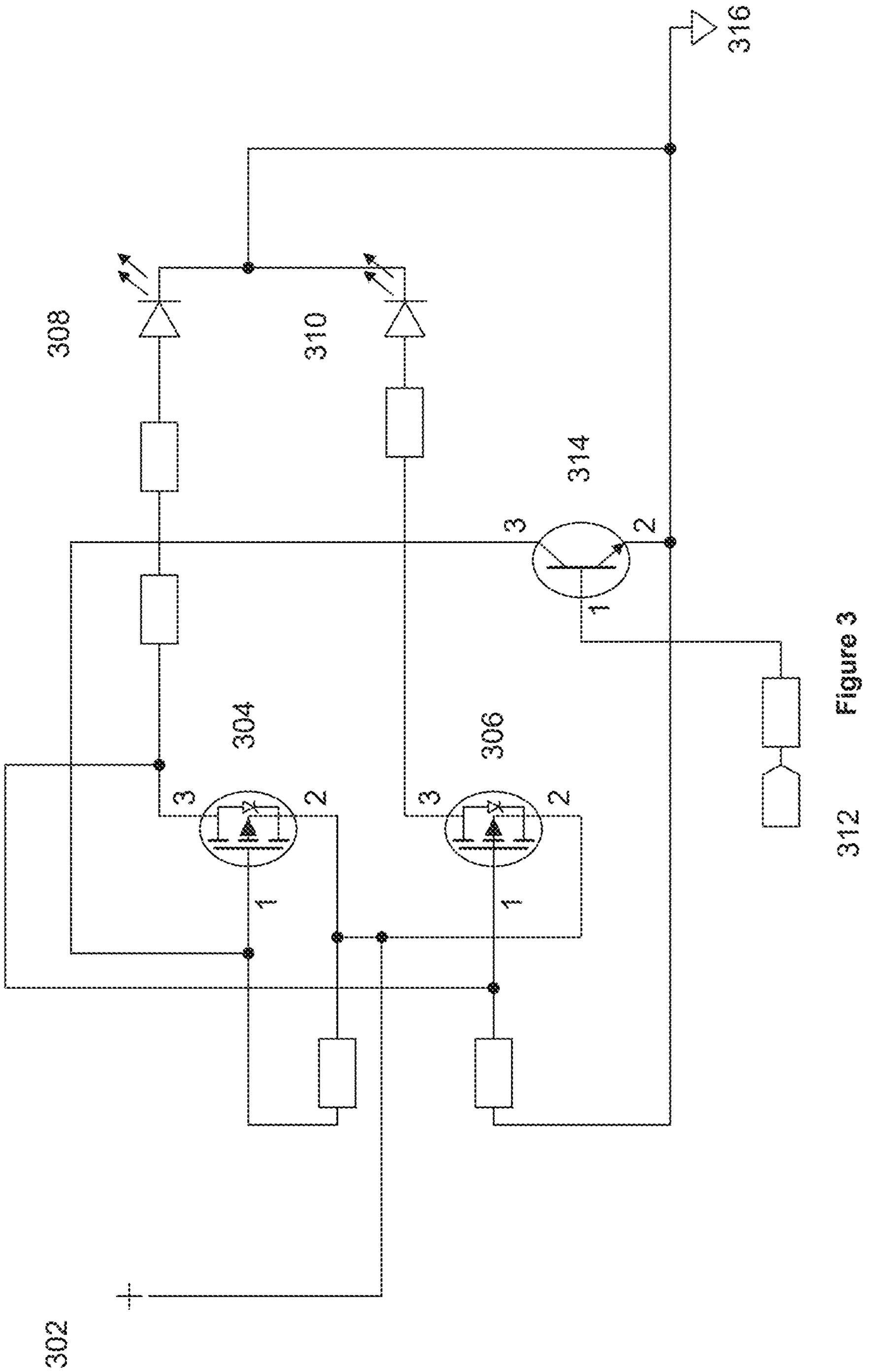
FIG. 3 shows a schematic circuit diagram of a control circuit for controlling a telescopic sight of the present disclosure.

Turning to FIG. 3, there is shown a schematic circuit diagram of a control circuit 300 for controlling the telescopic sight of the present disclosure. The control circuit 300 comprises a power supply 302 and a ground connection 316. The power supply 302 and the ground connection 316 are connected to the power supply of the ECM. As will be discussed in more detail below, such a connection between the scope and the ECM may be achieved via electrical contacts arranged on the mounting rail/the sight mount.

The control circuit comprises a first electric switch 304, a second electric switch 306 and a third electric switch 314. The first and second electric switches 304, 306 may be MOSFET switches, e.g. 30V P-channel MOSFET switches. The third electrical switch may be a bipolar transistor, e.g. a 45V NPN general purpose transistor.

The DC power supply 302 is directly connected to the source of the first and second electronic switches 304, 306. The DC power supply 302 is further connected to the gate of the first electronic switch 304 and to the collector of the third electronic switch 314. The drain of the first electronic switch 304 is connected to a first LED 308. The drain of the second electronic switch 306 is connected to a second LED 310. The first and second LEDs 308, 310 are connected to the ground 316.

A control signal input 312 is connected to the base of the third electric switch 314. The emitter of the third electronic switch 314 is connected to the gate of the second electronic switch 306 and ground 316.

In operation, when the ECM is turned on, the power supply 302 is active and supplies the first LED 308 with an electric current as long as the third electronic switch 314 remains closed. The third electronic switch 314 remains closed as long as the one or more antennas of the ECM remain inactive, i.e. the antennas do not emit any RF radiation. Once one or more of the antennas are activated, a control signal is provided via the control signal input 312 that is sufficient to open the third electronic witch 314. Once the third electronic switch 314 is open, the gate of the first electronic switch 304 will no longer be provided with sufficient current, such that the first electronic switch 304 will close. At the same time, the gate of the second electronic switch 306 will be provided with a current flow to open the second electronic switch 306, thereby connecting the power supply 302 with the second LED 310.

It will be understood that the above electronic circuit 300 is one example of a flip-flop circuit used to control the ECM in its first and second states. Of course, any other suitable electronic circuit may be used to provide this functionality.

In one example, the control signal input for opening the third electronic switch 314 may be provided by a control unit as soon as the control unit determines that one or more of the antennas are active. Alternatively, the control signal may be an analogue signal sent to the base of the third electronic switch 314 directly as the trigger of the ECM is activated. In this alternative, the trigger of the ECM may act to close a manual switch (not shown) for supplying the required collector emitter current. In this alternative, diodes in reverse order may be utilised to create the "or" function between the first and second states of the sight.

The circuit 300 enables two different appearances of the telescopic sight in the two different states. In the first state, i.e. when none of the antennas emit radiation, only the first LED 308 is active and projects its light onto the reticule. In the example of FIGS. 2A and 2B, the first LED 308 may thus be a green LED. In the second state of the ECM, i.e. when one or more of the ECM antennas emit radiation, only the second LED 310 is active and projects its light onto the reticule of the telescopic sight. In the example of FIGS. 2A and 2B, the second LED 310 may thus be red. Of course, it will be understood that any suitable colours may be chosen for this purpose.

In some embodiments, other information may be projected onto the reticule 206 in the first and/or second states of the optical system. In one example, such information may include operating parameters of the ECM 100, such as the chosen RF band, the orientation, or the battery status of the ECM 100.

Alternatively or additionally, the telescopic sight may be configured to project target-data representative of a target UAV onto the reticule. Such target-data may comprise one or more of a distance of the target UAV from the counter measure effector, an altitude at which the target UAV is located, a travel speed of the target UAV, or a communication bandwidth used by the target UAV. The target-data may either be obtained by the ECM itself, e.g. via the two antennas 108, 109, or by means of remote sensors. In some examples, radar or lidar sensors may be in communication with the ECM to provide at least parts of the target-data, such as the position, altitude, and/or travel speed of the target UAV. The control unit of the ECM may receive such target-data and control the telescopic sight to display said target-data, e.g. via a light projection onto the reticule 206.

Figure 4:
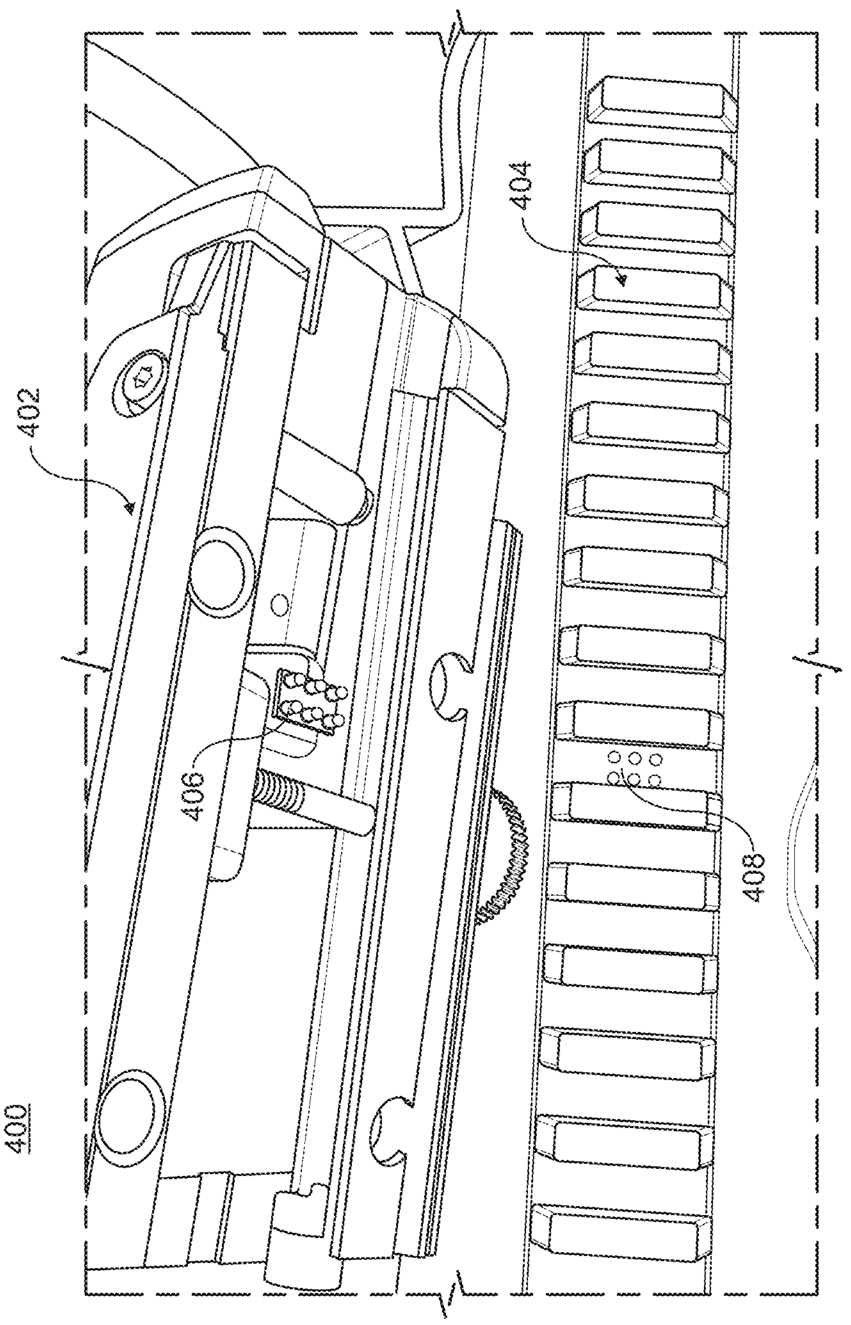
FIG. 4 shows corresponding electric contacts arranged on a mounting rail and a sight mount respectively.

FIG. 4 shows a perspective view of the bottom-half of a telescopic sight mount 402 and a top plan view of the mounting rail 404. As mentioned before, the mounting rail 404 and the sight mount 402 comprise corresponding electrical contacts 406, 408, arranged such that the electrical contacts engage, when the sight mount 402 is mechanically connected to the mounting rail. In the example of FIG. 4, the electrical contacts 406 of the sight mount 402 comprise spring pins configured to be depressed against the electrical contacts 408 of the mounting rails 404 as soon as the sight mount 402 is connected to the mounting rail 404.

It should be understood that, in the example of FIG. 4, the telescopic sight will need to be attached to a specific location along the mounting rail 404, such that the electrical contacts 406, 408 engage with each other. To this end, the mounting rail 404 and the scope mount 402 may have corresponding markings assisting the operator in aligning the two correctly.

Preferences and options for a given aspect, feature or parameter of the disclosure should, unless the context indicates otherwise, be regarded as having been disclosed in combination with any and all preferences and options for all other aspects, features and parameters of the disclosure.

The invention claimed is:

1. A counter measure effector for targeting unmanned aerial vehicles (UAVs), said counter measure effector comprising:

at least one antenna for selectively emitting electromagnetic radiation;

a mounting rail; and a telescopic sight comprising a sight mount for removable, mechanical connection to the mounting rail, and an optical system that is transferrable between a first state, in which the optical system has a first appearance, and a second state, in which the optical system has a second appearance that is different from the first appearance, wherein the counter measure effector is configured to set the optical system in its first state, when the at least one antenna is activated, and in its second state, when the at least one antenna is de-activated, and wherein the mounting rail and the sight mount comprise corresponding electrical contacts arranged such that the electrical contacts engage when the sight mount is mechanically connected to the mounting rail.

2. The counter measure effector of claim 1, wherein, in the first state, at least parts of the optical system of the telescopic sight have a first colour, and, in the second state, at least parts of the optical system have a second colour.

3. The counter measure effector of claim 1, wherein the optical system comprises a reticule configured to be illuminated in a first colour, when the optical system is set to its first state, and illuminated in a second colour, when the optical system is in its second state.

4. The counter measure effector of claim 1, wherein the telescopic sight comprises a reticule and is configured to project operating parameters of the counter measure effector onto the reticule.

5. The counter measure effector of claim 4, wherein the operating parameters comprises one or more of:

a frequency band selected for emission of electromagnetic radiation;

an orientation of the counter measure effector;

a battery status of the counter measure effector.

6. The counter measure effector of claim 1, wherein the telescopic sight comprises a reticule and is configured to project target-data representative of a target UAV onto the reticule.

7. The counter measure effector of claim 6, wherein the target-data comprises one or more of:

a distance of the target UAV from the counter measure effector;

an altitude at which the target UAV is located;

a travel speed of the target UAV;

a communication bandwidth used by the target UAV.

8. The counter measure effector of claim 1, wherein the telescopic sight is a holographic sight.

9. The counter measure effector of claim 1, comprising a power supply for generating electromagnetic radiation, wherein the telescopic sight is connected to said power supply.

10. The counter measure effector of claim 9, wherein the telescopic sight comprises a first light source and a second light source, and wherein, in the first state of the optical system, the power supply is connected to the first light source, and, in the second state of the optical system, the power supply is connected to the second light source.

11. The counter measure effector of claim 1, wherein the electrical contacts of the sight mount comprise spring pins configured to be depressed against the electrical contacts of the mounting rail, when the sight mount is mechanically connected to the mounting rail.

12. A method of controlling a counter measure effector, the counter measure effector comprising:

at least one antenna for selectively emitting electromagnetic radiation;

a mounting rail;

a telescopic sight comprising a sight mount for removable, mechanical connection to the mounting rail, and an optical system that is transferrable between a first state, in which the optical system has a first appearance, and a second state, in which the optical system has a second appearance that is different from the first appearance, wherein the mounting rail and the sight mount comprise corresponding electrical contacts arranged such that the electrical contacts engage when the sight mount is mechanically connected to the mounting rail;

wherein the method comprises:

receiving activation-data indicative of an activation status of the counter measure effector;

transferring the optical system into its second state when the activation-data is indicative of the counter measure effector being active.

13. The method of claim 12, comprising:

receiving command-data indicative of a permission to activate the counter measure effector;

transferring the optical system into its second state when the command-data is indicative of a prohibition of activating the counter measure effector.

14. The method of claim 12, comprising transferring the optical system into its first state if the command-data is indicative of a permission to activate the counter measure effector and the activation-data is indicative of the counter measure being inactive.

15. A counter measure effector for targeting unmanned aerial vehicles (UAVs), said counter measure effector comprising:

a power supply for generating electromagnetic radiation;

at least one antenna for selectively emitting electromagnetic radiation; and a telescopic sight connected to said power supply and comprising a first light source and a second light source, the telescopic sight further comprising an optical system that is transferrable between a first state, in which the optical system has a first appearance, and a second state, in which the optical system has a second appearance that is different from the first appearance, wherein the counter measure effector is configured to set the optical system in its first state, when the at least one antenna is activated, and in its second state, when the at least one antenna is de-activated, and wherein in the first state of the optical system, the power supply is connected to the first light source, and, in the second state of the optical system, the power supply is connected to the second light source.

16. The counter measure effector of claim 15, wherein, in the first state, at least parts of the optical system of the telescopic sight have a first colour, and, in the second state, at least parts of the optical system have a second colour.

17. The counter measure effector of claim 15, wherein the telescopic sight comprises a reticule and is configured to project operating parameters of the counter measure effector onto the reticule.

18. The counter measure effector of claim 17, wherein the operating parameters comprises one or more of:

a frequency band selected for emission of electromagnetic radiation;

an orientation of the counter measure effector;

a battery status of the counter measure effector.

19. The counter measure effector of claim 15, wherein the telescopic sight comprises a reticule and is configured to project target-data representative of a target UAV onto the reticule.

20. The counter measure effector of claim 19, wherein the target-data comprises one or more of:

a distance of the target UAV from the counter measure effector;

an altitude at which the target UAV is located;

a travel speed of the target UAV;

a communication bandwidth used by the target UAV.

* * * * *